US012565807B2

(12) United States Patent
Cai

(10) Patent No.: US 12,565,807 B2
(45) Date of Patent: Mar. 3, 2026

(54) RESISTANCE REGULATING DEVICE FOR ROPE-FREE CURTAIN

(71) Applicant: Anji Florid Artware Co., Ltd, Huzhou (CN)

(72) Inventor: Xiaoping Cai, Huzhou (CN)

(73) Assignee: Anji Florid Artware Co., Ltd, Huzhou (CN)

( * ) Notice: Subject to any disclaimer, the term of this patent is extended or adjusted under 35 U.S.C. 154(b) by 311 days.

(21) Appl. No.: 18/228,775

(22) Filed: Aug. 1, 2023

(65) Prior Publication Data

US 2024/0415309 A1 Dec. 19, 2024

(30) Foreign Application Priority Data

Jun. 16, 2023 (CN) ........................ 202310718216.0

(51) Int. Cl.

*E06B 9/323* (2006.01)
*E06B 9/32* (2006.01)
*E06B 9/322* (2006.01)

(52) U.S. Cl.

CPC ................ *E06B 9/323* (2013.01); *E06B 9/32* (2013.01); *E06B 9/322* (2013.01); *E06B 2009/3222* (2013.01)

(58) Field of Classification Search

CPC . E06B 9/32; E06B 9/322; E06B 9/323; E06B 2009/3222; E06B 9/324

See application file for complete search history.

(56) References Cited

U.S. PATENT DOCUMENTS

| | | | | | |
|---|---|---|---|---|---|
| 2,080,233 | A * | 5/1937 | Schierghofer | E06B 9/324 | 24/132 R |
| 4,357,980 | A * | 11/1982 | Rapp | E06B 9/32 | 160/176.1 R |
| 4,651,795 | A * | 3/1987 | Valle | E06B 9/262 | 24/136 A |
| 4,852,627 | A * | 8/1989 | Peterson | E06B 9/32 | 160/322 |

(Continued)

FOREIGN PATENT DOCUMENTS

| | | |
|---|---|---|
| CN | 209855661 U | 12/2019 |
| CN | 209855672 U | 12/2019 |

(Continued)

OTHER PUBLICATIONS

Translation of CN-210396591-U (Year: 2020).*

*Primary Examiner* — Daniel P Cahn
*Assistant Examiner* — John W Hanes, Jr.
(74) *Attorney, Agent, or Firm* — Olive Law Group, PLLC

(57) ABSTRACT

A resistance regulating device is applied to a lifting type push-pull positioning curtain, including a cavity formed in a frame body for fixing the curtain, wherein a side surface of the cavity is provided with a transverse rope hole, a bottom surface thereof is provided with a vertical rope hole, a rope body passes through the transverse rope hole and the vertical rope hole in sequence and is connected to the curtain and the other end of the rope body is connected to a retrieval device; and a retarding unit rotatably arranged in the cavity and configured to increase resistance suffered by the rope body during vertical movement; and the cavity is further internally provided with a stop rod configured to resist the retarding unit.

8 Claims, 10 Drawing Sheets

(56) References Cited

U.S. PATENT DOCUMENTS 5,709,258 A * 1/1998 Coccoluto ............... E06B 9/326 16/442
5,799,715 A * 9/1998 Biro ........................ E06B 9/322 160/170
6,302,182 B1 * 10/2001 Anderson ............... E06B 9/322 160/177 R
7,025,107 B2 * 4/2006 Ciuca ...................... E06B 9/322 160/170
7,578,334 B2 * 8/2009 Smith ....................... E06B 9/42 160/84.05
7,832,453 B2 * 11/2010 Lin ......................... E06B 9/307 160/176.1 R
8,167,086 B1 * 5/2012 Brendley ................. A62B 1/14 182/5
8,662,135 B2 * 3/2014 Lin ......................... E06B 9/322 160/170
8,925,615 B2 * 1/2015 Lin ......................... E06B 9/322 160/170
9,127,500 B2 * 9/2015 Huang .................... E06B 9/322
9,297,203 B2 * 3/2016 Hsueh-Cheng ......... E06B 9/322
9,316,050 B2 * 4/2016 Hsu ........................... E06B 9/32
9,708,851 B2 * 7/2017 Huang .................... E06B 9/322
9,714,538 B2 * 7/2017 Huang ...................... E06B 9/38
9,797,189 B2 * 10/2017 Huang .................... E06B 9/262
10,273,748 B2 * 4/2019 Chen ....................... E06B 9/322
10,273,749 B2 * 4/2019 Lei .......................... E06B 9/322
10,302,172 B2 * 5/2019 Chen ......................... E06B 9/80
10,501,985 B2 * 12/2019 Chen .................. B65H 75/4471
10,533,371 B2 * 1/2020 Chen .................... B65H 75/486
10,550,635 B2 * 2/2020 Lin ......................... E06B 9/324
10,563,455 B2 * 2/2020 Chen ....................... E06B 9/324
10,584,530 B2 * 3/2020 Hsu ......................... E06B 9/323
10,704,323 B2 * 7/2020 Chen ....................... E06B 9/322
10,704,658 B2 * 7/2020 Chen ................... F16H 19/0672
10,865,600 B2 * 12/2020 Zhang ..................... E06B 9/307
10,988,981 B2 * 4/2021 Lei .......................... E06B 9/324
10,995,545 B2 * 5/2021 Chen ....................... E06B 9/364
11,047,172 B2 * 6/2021 Huang .................... E06B 9/322
11,072,975 B2 * 7/2021 Chen ....................... E06B 9/322
11,286,714 B2 * 3/2022 Lei .......................... E06B 9/322
11,448,010 B2 * 9/2022 Lei .......................... E06B 9/307
11,473,370 B2 * 10/2022 Chen ....................... E06B 9/322
2006/0278348 A1 * 12/2006 Huang .................... E06B 9/322 160/170
2007/0084569 A1 * 4/2007 Lin ......................... E06B 9/262 160/170
2008/0128097 A1 * 6/2008 Yu ........................... E06B 9/322 160/368.1
2010/0206492 A1 * 8/2010 Shevick .................... E06B 9/30 160/170
2011/0247766 A1 * 10/2011 Hu .......................... E06B 9/322 160/188
2011/0290429 A1 * 12/2011 Cheng ..................... E06B 9/322 160/84.02
2012/0032019 A1 * 2/2012 Chen ....................... E06B 9/322 242/378
2015/0129142 A1 * 5/2015 Huang .................... E06B 9/322 160/370
2015/0240559 A1 * 8/2015 Chen ....................... E06B 9/322 160/168.1 R
2015/0275572 A1 * 10/2015 Huang .................... E06B 9/322 160/173 R
2015/0376940 A1 * 12/2015 Hsu ......................... E06B 9/322 160/169
2018/0202220 A1 * 7/2018 Huang .................... E06B 9/322
2018/0291678 A1 * 10/2018 Zheng ..................... E06B 9/322
2018/0313143 A1 * 11/2018 Chang ..................... E06B 9/322
2019/0048660 A1 * 2/2019 Huang ...................... E06B 9/58
2019/0093426 A1 * 3/2019 Huang .................... E06B 9/262
2019/0301238 A1 * 10/2019 Chang ..................... E06B 9/322
2019/0323289 A1 * 10/2019 Chen .................... B65H 75/486
2020/0040655 A1 * 2/2020 Chen .................... B65H 75/446
2020/0095825 A1 * 3/2020 Chen ....................... E06B 9/322
2020/0157879 A1 * 5/2020 Lei .......................... E06B 9/305
2020/0399955 A1 * 12/2020 Chen ....................... E06B 9/322
2022/0228433 A1 * 7/2022 Hong ...................... E06B 9/323
2022/0341255 A1 * 10/2022 Luo ......................... E06B 9/323
2023/0140382 A1 * 5/2023 Chen ....................... E06B 9/324 160/266
2023/0399891 A1 * 12/2023 Huang .................... E06B 9/326
2024/0240516 A1 * 7/2024 Hsieh ...................... E06B 9/388
2024/0415309 A1 * 12/2024 Cai .......................... A47H 5/00

FOREIGN PATENT DOCUMENTS

CN 209855676 U 12/2019
CN 210396591 U * 4/2020
CN 211623257 U 10/2020

* cited by examiner

RESISTANCE REGULATING DEVICE FOR ROPE-FREE CURTAIN

CROSS-REFERENCE TO RELATED APPLICATIONS

The application claims the benefit of China Patent Application No. 2023107182160, filed on Jun. 16, 2023, which is incorporated herein by reference in its entirety.

FIELD OF TECHNOLOGY

The present disclosure belongs to the technical field of indoor devices, and particularly relates to a resistance regulating device for a rope-free curtain.

BACKGROUND

A curtain is a kind of a roller curtain made of a cord fabric subjected to resin treatment or woven by bamboo canes or reed canes. The curtain rises and falls by means of a rope or a chain. A common curtain is pulled by the rope connected to the lower end thereof, so that the curtain is folded and pulled upwards. The rope is loosened, so that the curtain droops automatically. A push-pull rope is locked or loosened by a retracting mechanism fixed to an upper rail. People need to pull the stretching end of the rope when retracting this kind of curtain, so that the other end of the rope can lift the droop end of the curtain, and the curtain is folded. If the curtain is controlled in this way, it is laborious to push and pull the rope, and the pulled rope exposed and drooped is encumbered and cannot be stored. The exposed rope is usually entangled with other articles and falls on the ground to stumble and even rein children easily, resulting in potential safety hazards.

The applicant has proposed a lifting type push-pull positioned roller curtain without an unexposed rope previously, where the curtain is self-locked and positioned, and the unfolding length of the curtain can be adjusted infinitely (CN209855661U). However, the curtain itself has a weight. When the used curtain is too heavy, the upward pull of the rope is not enough to maintain the curtain in the roller curtain state, so that the stored curtain will fall down itself, which affects use.

In conclusion, it is a need of a device capable of not affecting normal use of the curtain and maintaining the curtain in the roller curtain state at present.

SUMMARY

The objective of the present disclosure is to provide a resistance regulating device for a rope-free curtain. When a curtain body is rolled upwards in a rolled state, a retarding unit of the resistance regulating device rotates to the stop rod and scarcely generates any resistance to the rope body. When the rolled body is unfolded downwards to the curtain body, the retarding unit rotates to a bottom end of a cavity and improves the resistance to the rope body. On this basis, the retarding unit can prevent the rolled curtain from having a tendency of falling down to a certain extent.

The present disclosure adopts the following technical solution to solve the above problems: a resistance regulating device for a rope-free curtain, including:

a cavity arranged on a frame body for fixing a curtain, wherein a side surface of the cavity is provided with a transverse rope hole, a bottom surface thereof is provided with a vertical rope hole, one end of a rope body passes through the transverse rope hole and the vertical rope hole in sequence and is connected to the curtain and the other end of the rope body is connected to a retrieval device; and a retarding unit rotatably arranged in the cavity and configured to increase resistance suffered by the rope body during vertical movement; and the cavity is further internally provided with a stop rod configured to resist the retarding unit.

The retrieval device has the function of recovering the curtain upwards by tightening the rope body and providing an upward pull finitely to limit downward unfolding of the curtain. One specific structure of the retrieval device can refer to a push-pull positioning device in CN209855661U. The retarding unit plays a role of enhancing the pull of the rope body toward the direction of the retrieval device in assisted manner on the one hand without affecting the process that the rope body is away from the retrieval device.

In the prior art, the way to solve the above problems is to replace it with a reel bearing with a stronger bearing capacity or to use light curtain cloth, or design the curtain segmentally to reduce the weight of each segment of the curtain, or to increase the diameter of the reel and to improve the bearing capacity of the reel. However, with respect to the above various ways, the curtain needs to be refitted, which is quite troublesome and poor in universality. It cannot be guaranteed that each curtain can meet the requirements. The resistance regulating device designed in the disclosure has the advantage that the resistance regulating device is suitably installed on various curtains with high universality.

In particular, the resistance regulating device in the disclosure is particularly suitable for Roman curtain which is a kind of foldable curtain usually consisting of an upper cross bar, a cord fabric, a cloth guide rail and a lower weight bar. The Roman curtain can be horizontally folded or vertically folded. The curtain cloth will form smooth wrinkles when being folded, so that the curtain looks more beautiful. The Roman curtain features aesthetics and practicality. The Roman curtain can be adapted to different window shapes and sizes and also can provide good shading and privacy protection. Besides, the Roman curtain in a direct upward folding form is more easily cleaned and maintained. However, the Roman curtain has the shortcoming that the Roman curtain is easy to fall down due to its self weight after it is stored upwards, so the resistance regulating device in the application is further needed to prevent the tendency that the stored Roman curtain falls.

A further preferred technical solution lies in that the resistance regulating device for a rope-free curtain further includes a resistance regulating unit, arranged in the cavity and configured to regulate the resistance to the rope body.

A further preferred technical solution lies in that the cavity is further internally provided with a rotating column groove; the retarding unit comprises a rotating column installed in the rotating column groove, a circulating part rotatably installed on the rotating column, and a transverse driving lever and a vertical driving lever arranged on the circulating part.

A further preferred technical solution lies in that the retarding unit further includes a limiting rod, and the rope body is located between the limiting rod and two driving levers including the transverse driving lever and the vertical driving lever.

A further preferred technical solution lies in that the retarding unit further includes a stopping bulge arranged at an end of the circulating part.

A further preferred technical solution lies in that the cavity is further internally provided with a regulating column groove vertically formed between the retarding unit and the transverse rope hole; and the resistance regulating unit includes a regulating column moving along the regulating column groove.

A further preferred technical solution lies in that the resistance regulating unit further includes regulating frames installed at both ends of the regulating column, regulating threaded holes formed in bottom surfaces of the regulating frames and regulating bolts in screw joint in the regulating threaded holes.

A further preferred technical solution lies in that the cavity is further internally provided with a positioning column located between the regulating column and the transverse rope hole.

A further preferred technical solution lies in that the cavity is further internally provided with a resistance increasing hole located in a lateral side of the vertical rope hole.

A further preferred technical solution lies in that the retarding unit further includes a guide surface arranged at a lower end of the stopping bulge.

In conclusion, the present disclosure further includes the following beneficial effects:

1. The resistance regulating device does not affect normal use of the curtain, and gives certain upward resistance when the curtain falls to prevent the curtain from falling. The resistance just can resist falling of the curtain caused by self weight without affecting the process of pulling down the curtain manually;
2. The positioning column exports the rope body from the transverse rope hole outwards substantially horizontally to prevent generation of friction between the rope body and the inner side surface of the transverse rope hole;
3. By regulating the regulating column downwards, the angle between the regulating column and the rope body between the transverse driving lever and the positioning column increases to increase the frictional force between the rope body and each rod body, so that the resistance increases; and
4. After the rope body C is transferred to the resistance increasing hole 106, the resistance suffered by the rope body during downward transfer can be further improved.

Figure 1:
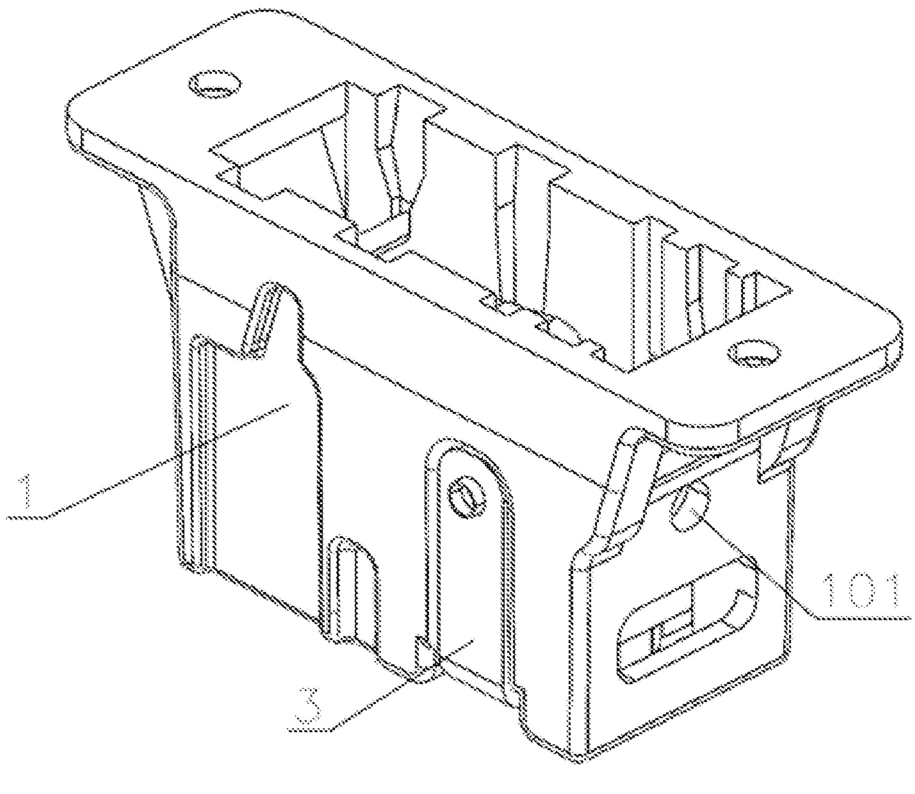
FIG. 1 is a structural schematic diagram of a resistance regulating device.

In the drawings, parts represented by numerals are as follows: A—curtain; B—frame body; C—rope body; D—retrieval device; 1—cavity; 2—retarding unit; 3—resistance regulating unit; 101—transverse rope hole; 102—vertical rope hole; 103—stop rod; 104—rotating column groove; 105—positioning column; 106—resistance increasing hole; 107—regulating column groove; 201—rotating column; 202—circulating part; 203—transverse driving lever; 204—vertical driving lever; 205—limiting rod; 206—stopping bulge; 301—regulating column; 302—regulating frame; 303—regulating threaded hole; 304—regulating bolt; 206*a*—guide surface.

DESCRIPTION OF THE EMBODIMENTS

The present disclosure will be further described in detail below in combination with drawings.

The specific embodiments are merely used to explain the present disclosure rather than limiting the present disclosure. Those skilled in the art can make modifications on the embodiments without creative contributions as needed after reading the description, but the modifications within the scope of the claims of the present disclosure all are protected by the patent law.

Embodiment I

In the embodiment, a resistance regulating device includes:

a cavity 1, a retarding unit 2 and a resistance regulating unit 3, wherein the cavity 1 includes a transverse rope hole 101, a vertical rope hole 102, a stop rod 103, a rotating column groove 104, a positioning column 105 and a regulating column groove 107;

The retarding unit 2 includes a circulating part 202, a transverse driving lever 203, a vertical driving lever 204, a limiting rod 205 and a stopping bulge 206; and the resistance regulating unit 3 includes a regulating column 301, a regulating frame 302, a regulating threaded hole 303 and a regulating bolt 304.

FIG. 1 shows a structural schematic diagram of the resistance regulating device. The cavity 1 is integrally bathtub-shaped. A transverse rope hole 101 is formed in a proximal end of the cavity 1, and a U-shaped resistance regulating unit 3 is further arranged on a side of the transverse rope hole 101 of the cavity 1.

Figure 2:
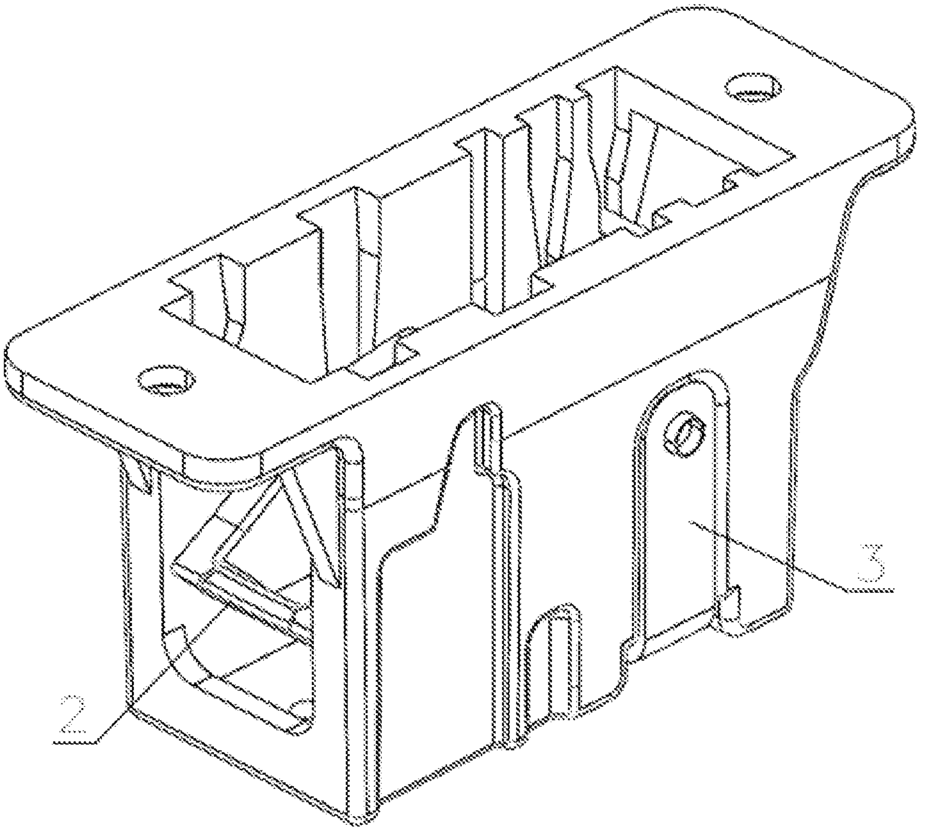
FIG. 2 is a schematic diagram of FIG. 1 at an anticlockwise rotating angle.

FIG. 2 shows a schematic diagram of FIG. 1 at an anticlockwise rotating angle. The other side of the transverse rope hole 101 of the cavity 1 is provided with an observation window, through which the retarding unit 2, relative to the other side of the transverse rope hole 101, arranged in the cavity 1 can be seen, and the resistance regulating unit 3 is located between the retarding unit 2 and the transverse rope hole 101.

Figure 3:
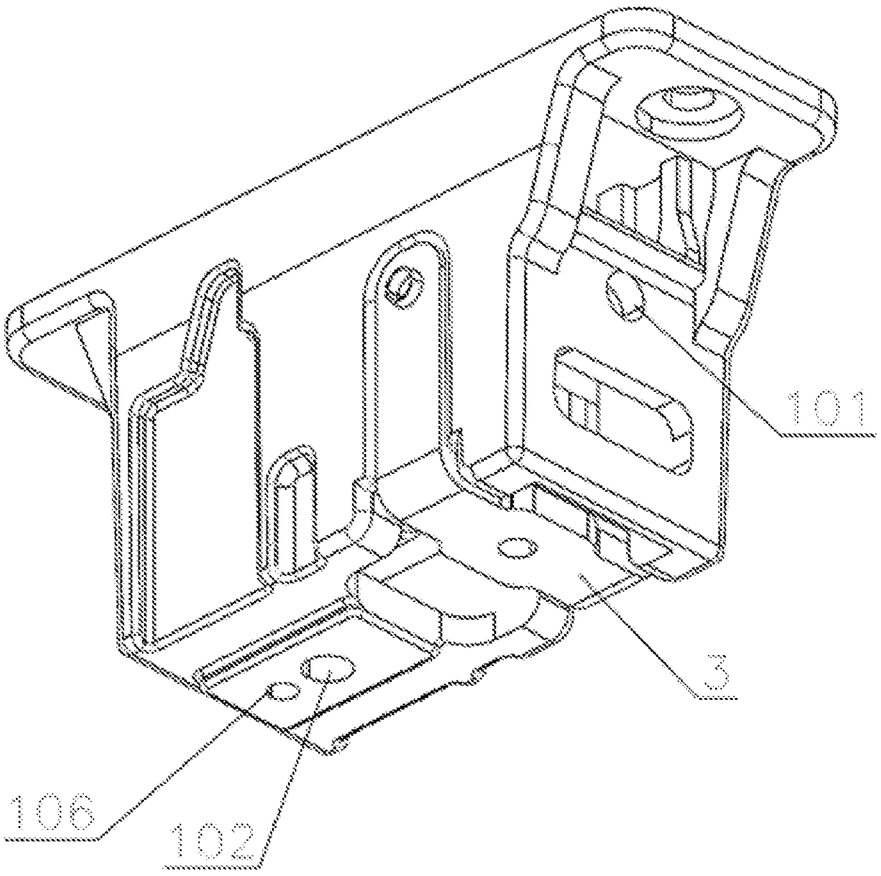
FIG. 3 is a schematic diagram of FIG. 2 at an inward turning angle.

FIG. 3 shows a schematic diagram of FIG. 2 at an inward turning angle. A vertical rope hole 102 is formed below the cavity 1, a resistance increasing hole 106 with smaller diameter is further formed in a side, where the vertical rope hole 102 is away from the resistance regulating unit 3, and the resistance regulating unit 3 is located between the vertical rope hole 102 and the transverse rope hole 101.

Figure 4:
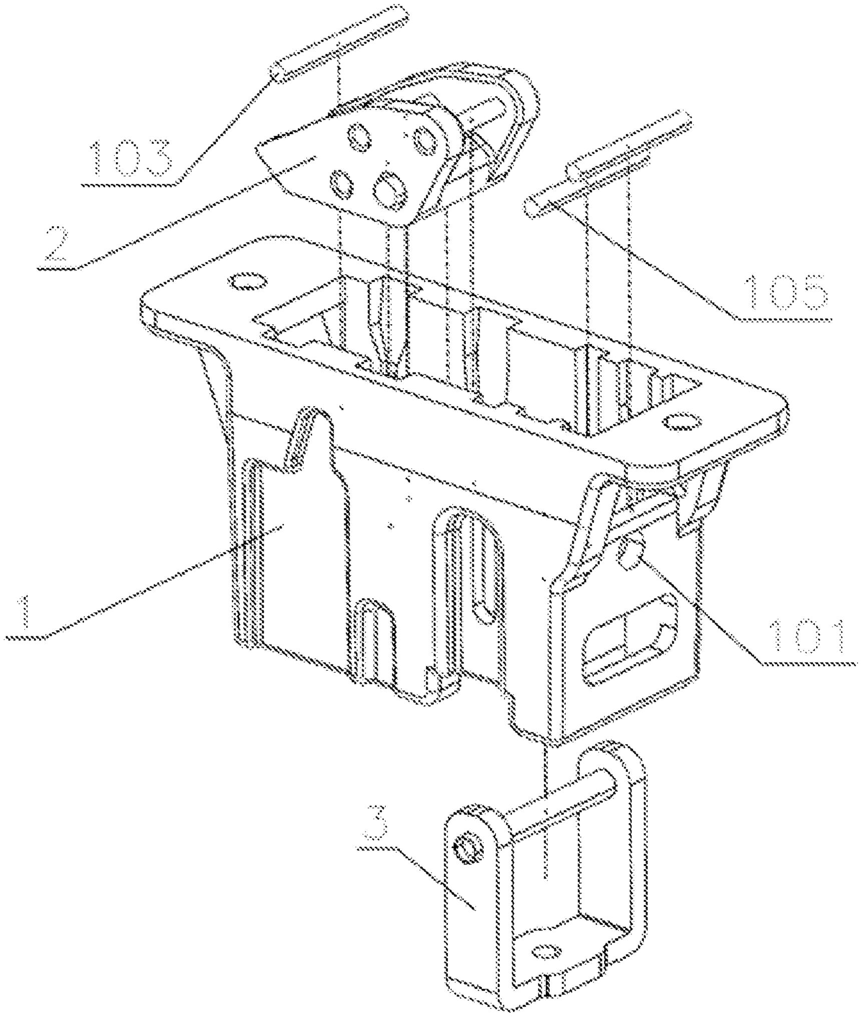
FIG. 4 is a schematic diagram of a breakdown structure of FIG. 1.

FIG. 4 shows a schematic diagram of a breakdown structure of FIG. 1. All components are separated vertically outwards from the cavity 1, and the substantial structures of the retarding unit 2 and the resistance regulating unit 3 and the positions where they are installed in the cavity 1 can be seen.

Figure 5:
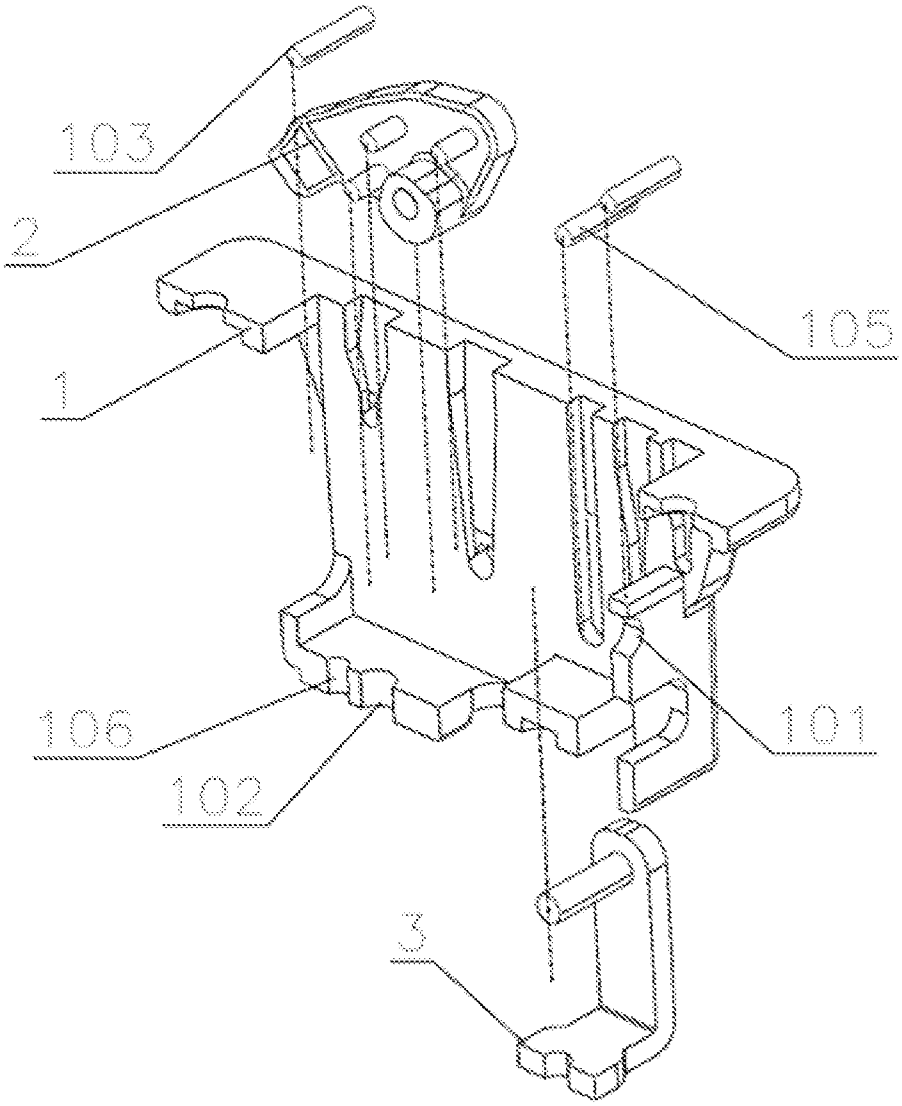
FIG. 5 is a schematic diagram of FIG. 4 along a vertical section.

FIG. 5 shows a schematic diagram of FIG. 4 along a vertical section. The circulating part 202 of the retarding unit 2 is internally provided with a plurality of column bodies; the stop rod 103 and the positioning column 105 are installed in the cavity 1 through the installation groove shrinking downward; the vertical rope hole 102 and the resistance increasing hole 106 are formed in the middle position of the bottom surface of the cavity 1; and the transverse rope hole 101 is formed in the middle position of the side surface of the cavity 1.

Figure 6:
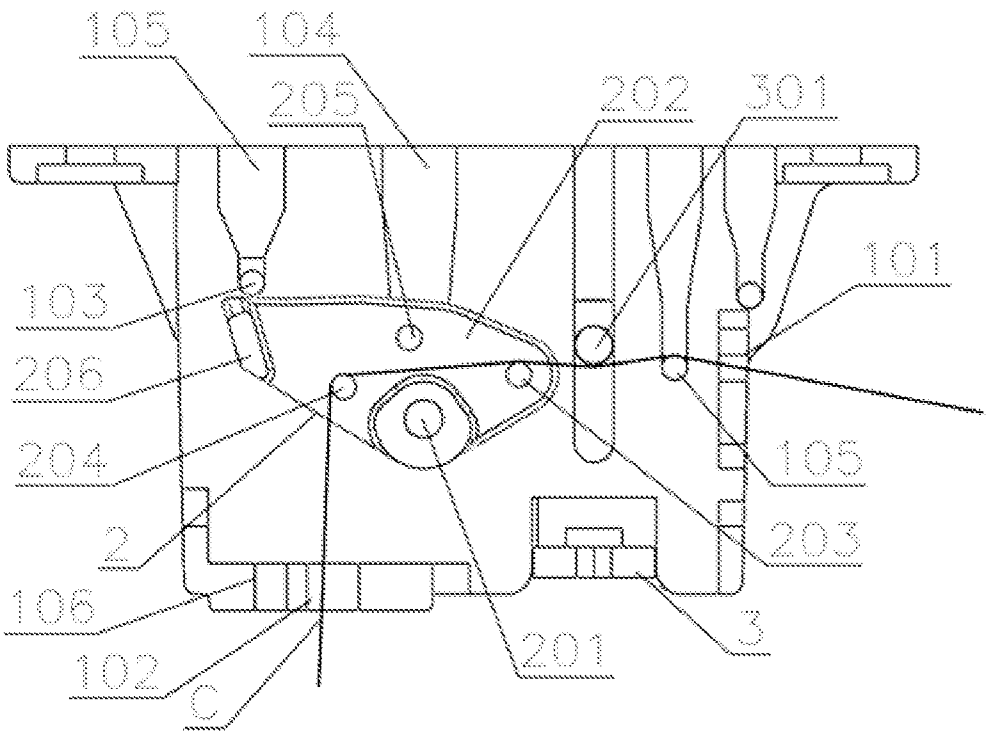
FIG. 6 is a schematic diagram of the resistance regulating device along the vertical section.

FIG. 6 shows a schematic diagram of the resistance regulating device along the vertical section. In the figure, the rope body C is pulled outwards from the transverse rope hole 101, i.e., the rope body is pulled close towards the retrieval device D. The rope body C is at a relatively gentle angle among the transverse driving lever 203, the regulating column 301 and the positioning column 105, i.e., the pressure acted on each rod is small. The frictional force of each rod acting on the rope body C in turn is small, so that when the rope body C is pulled outwards from the transverse rope hole 101, the resistance suffered is small.

In the figure, the regulating column 301 is located between the transverse driving lever 203 and the positioning column 105, the height position of the positioning column 105 in the cavity 1 is the same as that of the transverse rope hole 101, and the positioning column 105 plays a role of exporting the rope body C from the transverse rope hole 101 approximately horizontally to prevent generation of friction between the rope body C and the inner side surface of the transverse rope hole 101.

In the figure, the stop rod 103 is in a proper height position. In the position, the circulating part 202 is withstood, so that it cannot rotate continuously. The position is either the position with the minimum angle between the rope body C and each rod body or the position where the rope body C is suffered from the minimum resistance.

Figure 7:
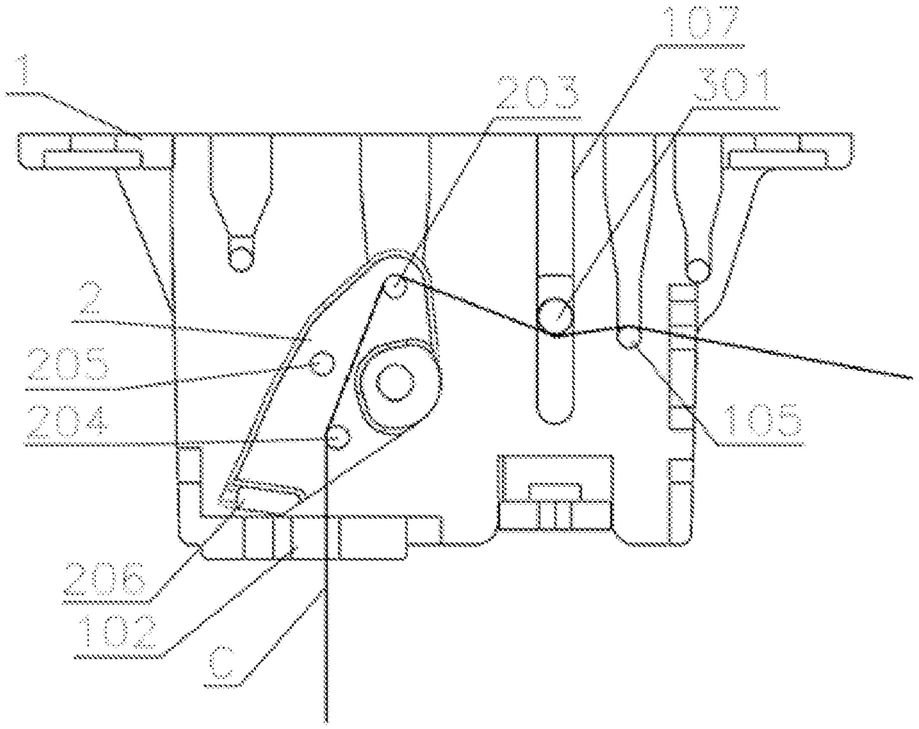
FIG. 7 is a schematic diagram showing downward movement of a rope body in FIG. 6, so that the retarding unit rotates anticlockwise.

FIG. 7 is a schematic diagram showing downward movement of the rope body in FIG. 6, so that the retarding unit rotates anticlockwise. In the figure, the rope body C is pulled outwards from the vertical rope hole 102, i.e., the rope body is pulled away towards the retrieval device D. Under the moving tendency of the rope body C, the vertical driving lever 204 is suffered from the downward pressure of the rope body C to compel the circulating part 202 to rotate anticlockwise along the rotating column 201, so that the height of the transverse driving lever 203 is increased and the height of the vertical driving lever 204 is decreased, and the angle formed the rope body C located therebetween is increased. Meanwhile, the angle of the rope body C between the transverse driving lever 203 and the regulating column 301 is increased, too. Thus, the pressure of the rope body C acting on each rod body is increased, too, and the frictional force of each rod acting on the rope body C is increased as well. Therefore, when the rope body is pulled outwards from the vertical rope hole 102, the resistance suffered will increase therewith.

In the figure, the rotating column 201 is located between the transverse driving lever 203 and the vertical driving lever 204. Such an arrangement has the advantage that when the circulating part 202 rotates along the rotating column 201, the transverse driving lever 203 and the vertical driving lever 204 move inevitably in opposite vertical directions. In FIG. 6, the rope body C has been located in the position where the resistance is the minimum, and in this case, if the circulating part 202 is rotated again, the frictional force between the rope body C and each rod will be inevitably increased.

In the figure, the stopping bulge 206 can be seen. When the circulating part 202 rotates to a certain extent, the stopping bulge 206 leans against the bottom surface on the inner side of the cavity 1, so that the s circulating part 202 stops rotating.

Figure 8:
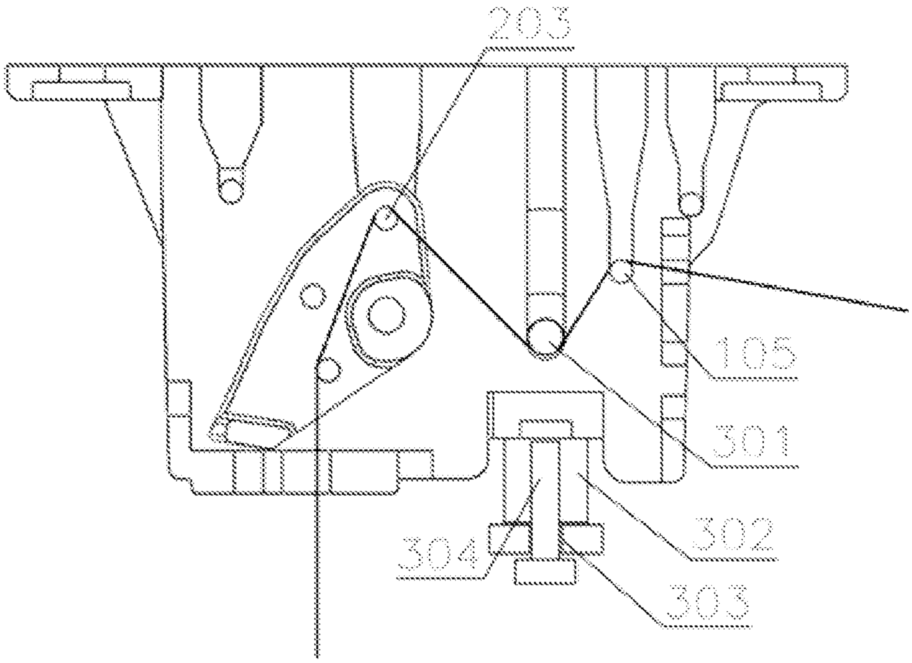
FIG. 8 is a schematic diagram showing that the regulating column is regulated downwards in FIG. 7.

FIG. 8 is a schematic diagram showing that the position of the regulating column is regulated downwards in FIG. 7. The way of regulating the regulating column 301 is as follows: the regulating bolt 304 is in screw joint to the regulating threaded hole 303, and the deeper the screw joint is, the longer the length of the regulating bolt 304 between the regulating frame 302 and the bottom surface of the cavity is, so that the regulating column 301 fixed together with the regulating frame 302 moves downwards. When the regulating column 301 moves downwards, the angle of the rope body C between the regulating column 301 and the transverse driving lever 203 and the positioning column 105 will be increased, so that the frictional force between the rope body C and each rod body is increased, and thus, the resistance is increased, which not only affects the process that the rope body C moves outwards in the vertical direction along the vertical rope hole 102, but also affects the process that the rope body C moves outwards in the horizontal direction along the transverse rope hole 101.

Figure 10:
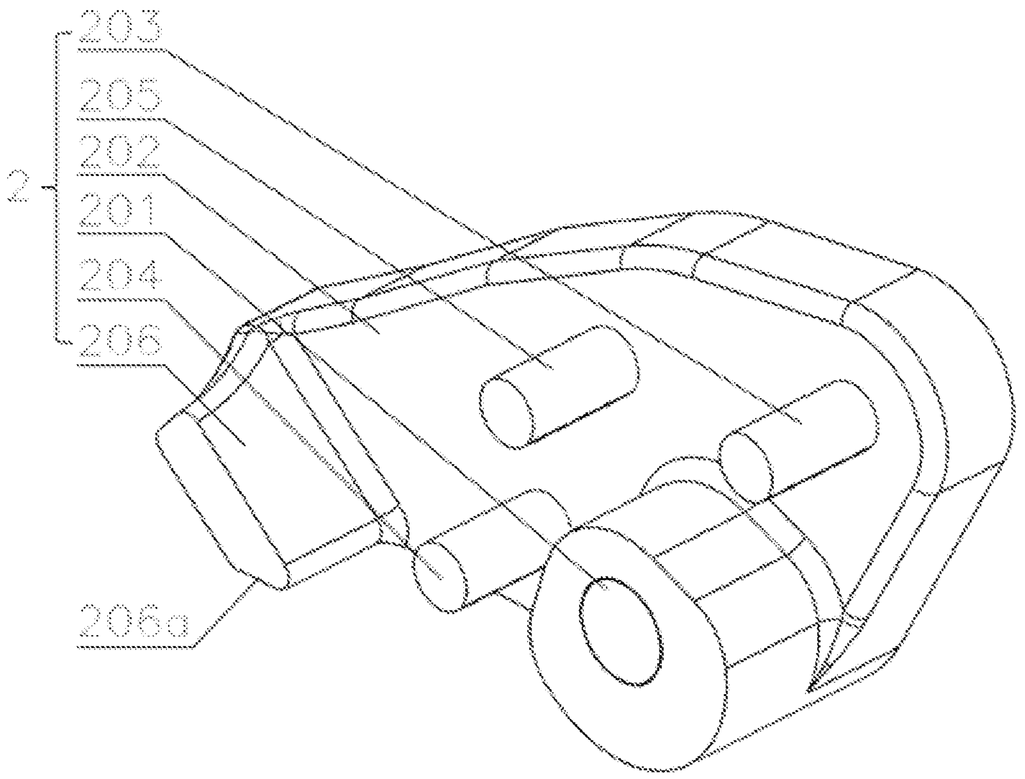
FIG. 10 is a structural schematic diagram of the retarding unit along the vertical section.

FIG. 10 is a structural schematic diagram of the retarding unit along the vertical section. The figure shows a three-dimensional structure of the retarding unit 2. Each transverse driving lever 203, vertical driving lever 204 and limiting rod 205 are fixedly arranged on the inner side surface of the circulating part 202, and the rotating column 201 is rotatably arranged on the circulating part 202.

Figure 11:
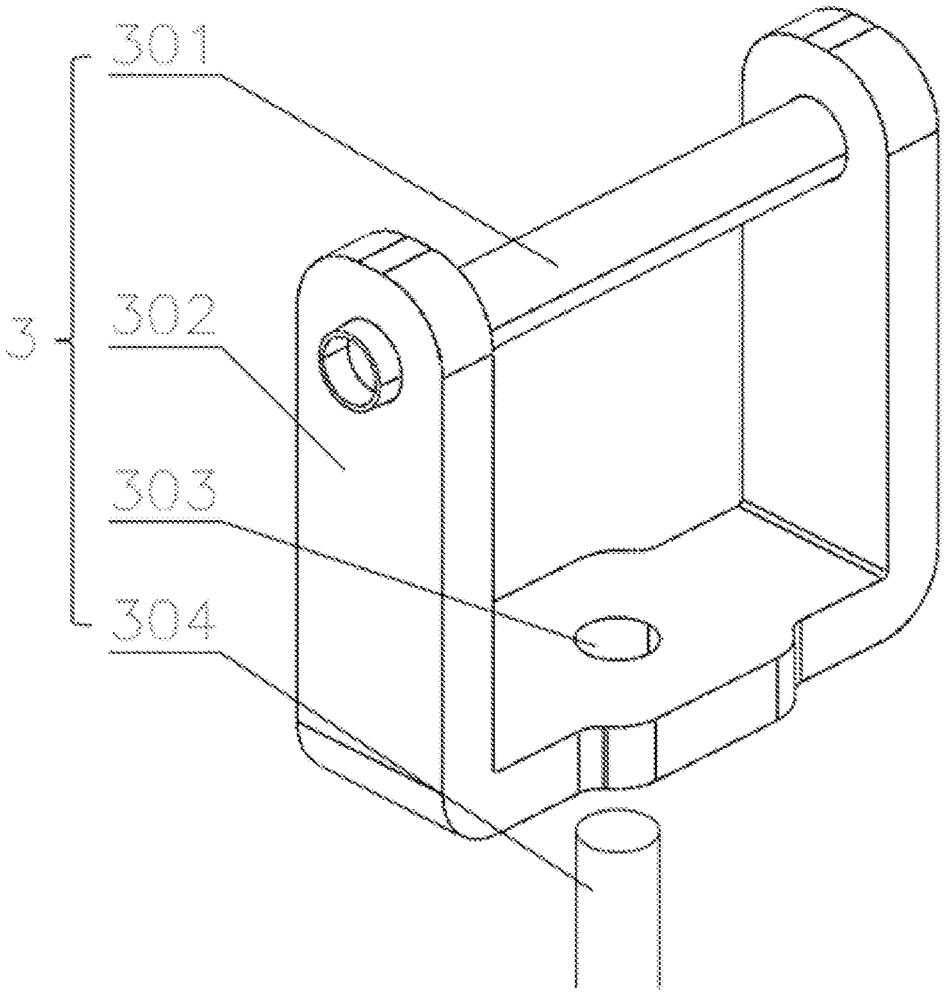
FIG. 11 is a structural schematic diagram of the resistance regulating device.

FIG. 11 is a structural schematic diagram of the resistance regulating device. The resistance regulating unit 3 is of a U-shaped structure, the regulating column 301 is arranged between two top ends of the U shape, and the regulating threaded hole 303 is formed at the center of the lower end of the U shape.

Figure 12:
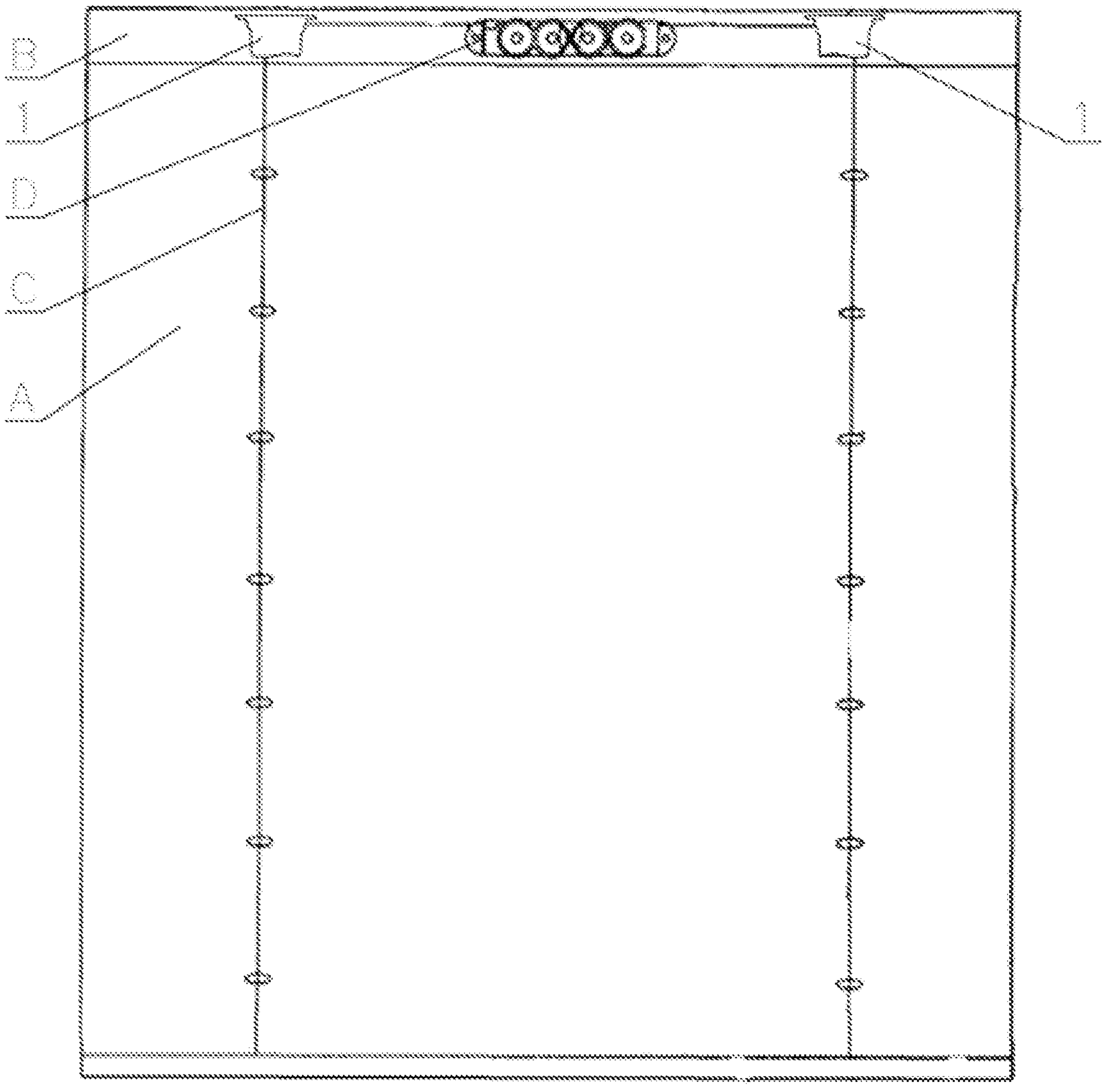
FIG. 12 is a schematic diagram of the resistance regulating device applied to a curtain.

FIG. 12 is a schematic diagram of the resistance regulating device applied to a curtain. The cavity 1 is arranged on a frame body B for fixing a curtain A, and in combination with the above figure, the side surface of the cavity 1 is provided with the transverse rope hole 101, the bottom surface thereof is provided with a vertical rope hole 102, one end of the rope body C passes through the transverse rope hole 101 and the vertical rope hole 102 in sequence and is connected to the curtain A and the other end of the rope body C is connected to the retrieval device D. Besides, in the figure, the unfolded state of the curtain A is shown. During installation, the cavity 1 is located on both sides of the retrieval device D, and the retrieval device D and the cavity 1 both are located on the frame body B. When the rope body C is pulled upwards, the curtain A is restored upwards. When the stored curtain A is unfolded downwards, the rope body C is released downwards therewith.

In conclusion, a using method of the resistance regulating device includes the following steps:

S01: the cavity 1 is installed on the frame body B configured to fix the curtain A, and the retarding unit 2, the resistance regulating unit 3, the stop rod 103 and the positioning column 105 are installed in sequence in each installation groove in the cavity 1; and S02: one end of the rope body C is connected to the retrieval device D and the other end thereof penetrates through the cavity 1 from the transverse rope hole 101, penetrates through the upper side of the positioning column 105, the lower side of the regulating column 301, the upper side of the transverse driving lever 203, the lower side of the limiting rod 205 and the upper side of the vertical driving lever 204 in sequence, and penetrates out of the vertical rope hole 102 to be connected to the curtain A.

Embodiment II

In the embodiment, a resistance regulating device is substantially the same as that in the embodiment I. The difference lies in that the cavity 1 further includes a resistance increasing hole 106, wherein a stopping bulge 206 is provided with a guide surface 206*a*.

Figure 9:
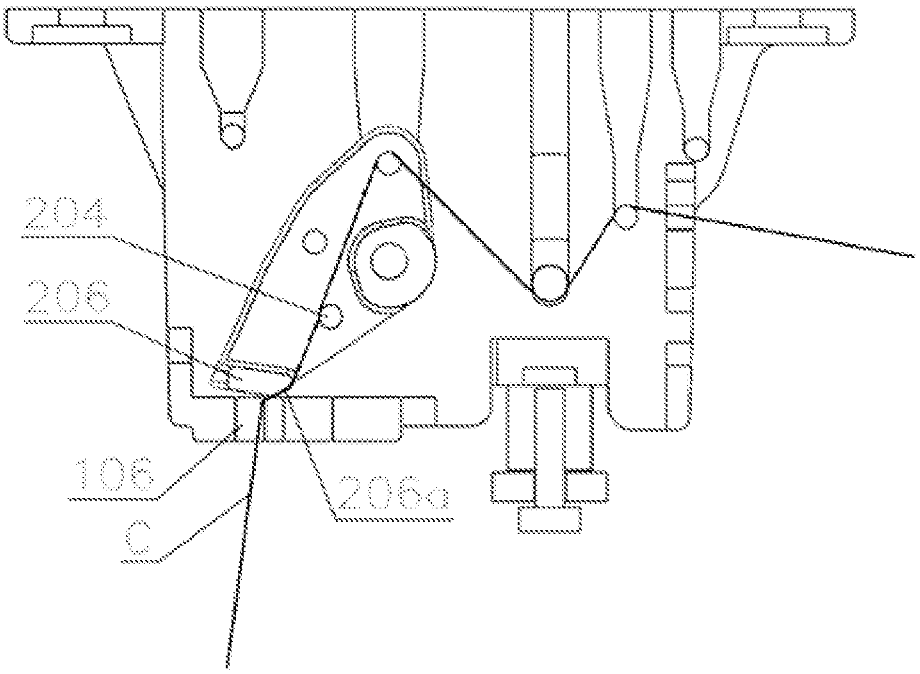
FIG. 9 is a schematic diagram showing that the rope body is installed in a resistance increasing hole in FIG. 8.

FIG. 9 is a schematic diagram showing that the rope body is installed in a resistance increasing hole in FIG. 8. When the frictional force between the rope body C and each rod body is not enough to resist the gravity of the curtain A, the rope body C can be moved to the resistance increasing hole 106, and in this case, when the rope body C moves downwards along the resistance increasing hole 106, the downward force is stilled acted on the vertical driving lever 204, so that the circulating part 202 rotates anticlockwise. In this case, the stopping bulge 206 leans against a position near an orifice of the resistance increasing hole 106 to just clamp the rope body C, and in the continuous downward moving process of the rope body C, the stopping bulge 206 is kept in a state where the rope body C is clamped. Besides, a contact surface between the stopping bulge 206 and the rope body C is provided with the smooth guide surface 206*a* to prevent the stopping bulge 206 from locking the rope body C directly. The above design can target the curtain A with larger self weight to prevent it from falling automatically during use, so that a self-locking effect is gained.

In conclusion, a using method of the resistance regulating device includes the following steps:

S11: the cavity 1 is installed on the frame body B configured to fix the curtain A, and the retarding unit 2, the resistance regulating unit 3, the stop rod 103 and the positioning column 105 are installed in sequence in each installation groove in the cavity 1; and S12: one end of the rope body C is connected to the retrieval device D and the other end thereof penetrates through the cavity 1 from the transverse rope hole 101, penetrates through the upper side of the positioning column 105, the lower side of the regulating column 301, the upper side of the transverse driving lever 203, the lower side of the limiting rod 205 and the upper side of the vertical driving lever 204 in sequence, and penetrates out of the resistance increasing hole 106 to be connected to the curtain A.

Besides, same or similar component symbols are used as far as possible in the drawings and description to refer to same or similar parts or steps. The drawings are presented in a simplified form and are not drawn at a precise proportion. For the convenience and clarity, the directional terms such as top, bottom, left side, right side, upward, upper side, above, below, lower side, front and back could be used in the drawings. These and similar directional terms should not be construed as limitations to the scope of the present disclosure in any way.

What is claimed is:

1. A resistance regulating device for a rope-free curtain, comprising:

a cavity arranged on a frame body for fixing the curtain, wherein a side surface of the cavity is provided with a transverse rope hole, a bottom surface thereof is provided with a vertical rope hole, and the cavity is further internally provided with a regulating column groove vertically formed between a retarding unit and the transverse rope hole, one end of a rope body passes through the transverse rope hole and the vertical rope hole in sequence and is connected to the curtain and the other end of the rope body is connected to a retrieval device; and the retarding unit rotatably arranged in the cavity and configured to rotate following a movement of the rope body when the rope body moves outwards from the transverse rope hole to reduce resistance applied to the rope body, and configured to rotate following a movement of the rope body when the rope body moves outwards from the vertical rope hole to increase resistance applied to the rope body; and the cavity is further internally provided with a stop rod configured to resist the retarding unit; and a resistance regulating unit, comprising a regulating column arranged in the regulating column groove and a regulating bolt, wherein the regulating bolt is configured to drive the regulating column to move along the regulating column groove to adjust an angle of the rope body between the transverse rope hole and the retarding unit, thereby regulating resistance of the rope body.

2. The resistance regulating device for a rope-free curtain according to claim 1, wherein the cavity is further internally provided with a rotating column groove; the retarding unit comprises a rotating column installed in the rotating column groove, a circulating part rotatably installed on the rotating column, and a transverse driving lever and a vertical driving lever arranged on the circulating part.

3. The resistance regulating device for a rope-free curtain according to claim 2, wherein the retarding unit further comprises a limiting rod, and the rope body is located between the limiting rod and two driving levers including the transverse driving lever and the vertical driving lever.

4. The resistance regulating device for a rope-free curtain according to claim 2, wherein the retarding unit further comprises a stopping bulge arranged at an end of the circulating part.

5. The resistance regulating device for a rope-free curtain according to claim 1, wherein the resistance regulating unit further comprises a regulating frame installed at both ends of the regulating column, a regulating threaded hole formed in the bottom surfaces of the regulating frame and a regulating bolt in screw joint in the regulating threaded hole.

6. The resistance regulating device for a rope-free curtain according to claim 1, wherein the cavity is further internally provided with a positioning column located between the regulating column and the transverse rope hole.

7. The resistance regulating device for a rope-free curtain according to claim 1, wherein the cavity is further internally provided with a resistance increasing hole located in the bottom surface, to a lateral side of the vertical rope hole.

8. The resistance regulating device for a rope-free curtain according to claim 1, wherein the retarding unit further comprises a guide surface arranged at a lower end of stopping bulge.

* * * * *